US011993964B2

(12) United States Patent
Derham

(10) Patent No.: US 11,993,964 B2
(45) Date of Patent: May 28, 2024

(54) CASEMENT WINDOW LOCKING BAR SENSOR

(71) Applicant: MIGHTON PRODUCTS LIMITED, Saffron Walden (GB)

(72) Inventor: Michael Derham, Saffron Walden (GB)

(73) Assignee: Mighton Products Limited, Saffron Walden (GB)

( * ) Notice: Subject to any disclaimer, the term of this patent is extended or adjusted under 35 U.S.C. 154(b) by 146 days.

(21) Appl. No.: 17/761,343

(22) PCT Filed: Sep. 16, 2020

(86) PCT No.: PCT/GB2020/052235
§ 371 (c)(1),
(2) Date: Mar. 17, 2022

(87) PCT Pub. No.: WO2021/053330
PCT Pub. Date: Mar. 25, 2021

(65) Prior Publication Data

US 2022/0341229 A1 Oct. 27, 2022

(30) Foreign Application Priority Data

Sep. 17, 2019 (GB) ...................................... 1913414

(51) Int. Cl.
*E05C 1/06* (2006.01)
*E05B 41/00* (2006.01)
(Continued)

(52) U.S. Cl.
CPC ................ *E05C 1/06* (2013.01); *E05B 41/00* (2013.01); *E05B 45/06* (2013.01); *E05C 1/006* (2013.01); *E06B 3/36* (2013.01); *G08B 13/08* (2013.01)

(58) Field of Classification Search
CPC . E05B 45/06; E05B 41/00; E05C 1/06; E05C 1/006; E05C 9/02; E05C 9/066;
(Continued)

(56) References Cited

U.S. PATENT DOCUMENTS 5,226,256 A 7/1993 Fries et al.
8,269,627 B2 * 9/2012 Gore ..................... G08B 13/08 340/545.7
(Continued)

FOREIGN PATENT DOCUMENTS

DE 101 47 253 A1 4/2003
EP 0 878 600 A3 3/1998
(Continued)

OTHER PUBLICATIONS

International Search Report and Written Opinion dated Jan. 26, 2021 (Application No. PCT/GB2020/052235.
(Continued)

*Primary Examiner* — Justin B Rephann
(74) *Attorney, Agent, or Firm* — Brown & Brown IP Law PLLC

(57) ABSTRACT

A casement window locking assembly comprises a locking handle, a housing, a locking bar, and a coupling member to transfer movement of the locking handle to the locking bar. The locking handle is movable between a locked position and an unlocked position. The assembly comprises first and second sensors, the first sensor comprising a first handle component secured to the coupling member and a second handle component mounted within the housing in order to detect the locking handle being in a locked position, the second sensor comprising a first window component mounted in the housing and a second window component being arranged to be mounted on the window sash in order to detect the window sash being located in a closed position.
(Continued)

Rotational movement of the handle causes translational movement of the coupling member. Also, methods of providing a window status sensor system.

24 Claims, 8 Drawing Sheets

(51) Int. Cl.

| | |
|---|---|
| ***E05B 45/06*** | (2006.01) |
| ***E05C 1/00*** | (2006.01) |
| ***E06B 3/36*** | (2006.01) |
| ***G08B 13/08*** | (2006.01) |

(58) Field of Classification Search
CPC ................. E05C 9/10; E05C 2007/007; E05Y 2900/148; E06B 3/36; G08B 13/08
See application file for complete search history.

(56) References Cited

U.S. PATENT DOCUMENTS

| | | | | |
|---|---|---|---|---|
| 10,930,124 | B2 * | 2/2021 | Farnes | G08B 13/08 |
| 11,015,368 | B2 * | 5/2021 | DeBoer | E05B 65/0841 |
| 11,220,845 | B2 * | 1/2022 | Newman | E05C 3/046 |
| 11,692,371 | B2 * | 7/2023 | Vande Haar | E05B 65/0858 292/216 |
| 2007/0089370 | A1 * | 4/2007 | Kaiser | E05C 9/066 49/192 |
| 2008/0252451 | A1 | 10/2008 | Buchhalter | |
| 2008/0284595 | A1 | 11/2008 | Buchhalter | |
| 2010/0043504 | A1 * | 2/2010 | Minter | E05C 9/22 70/89 |
| 2010/0313480 | A1 * | 12/2010 | Verreault | E05B 17/22 49/358 |
| 2011/0296880 | A1 * | 12/2011 | Sieglaar | E05B 13/108 292/200 |
| 2012/0304715 | A1 | 12/2012 | Gore et al. | |
| 2014/0259931 | A1 * | 9/2014 | Plummer | E06B 3/66 361/679.01 |
| 2016/0356059 | A1 * | 12/2016 | Newman | E05C 3/046 |

FOREIGN PATENT DOCUMENTS

| | | | |
|---|---|---|---|
| GB | 2528468 | A | 1/2016 |
| JP | H02-274983 | A | 11/1990 |
| JP | 2004-232293 | A | 8/2004 |
| JP | 2013-044217 | A | 3/2013 |
| JP | 2019-032842 | A | 2/2019 |

OTHER PUBLICATIONS

GB Search Report dated Feb. 18, 2020 (Application No. 1913414.7).

International Preliminary Report on Patentability (Chapter I) dated Jan. 7, 2022 (Application No. PCT/GB2020/052235).

* cited by examiner

CASEMENT WINDOW LOCKING BAR SENSOR

FIELD OF THE INVENTION

The present invention relates to a casement window locking bar sensor, a window assembly comprising a casement window locking bar sensor and a method of detecting and/or monitoring the status of a casement window sash within a window frame.

BACKGROUND TO THE INVENTION

Security systems often include sensors to detect the unauthorised opening of a window, for example, during a burglary. Such sensors are generally located on the edge of the window located distally from the pivot with a corresponding sensing device being mounted on the window frame. As the window is pivoted towards an open position, the sensor is activated and an alarm signal may be generated. Such an alarm signal generally consists of a loud audible alarm which provides an alert to the property owner (or surrounding inhabitants) and also acts to scare the intruder due to the awareness of the unauthorised act having been detected.

Such alarms can be trigger inadvertently and these audible alarms may no longer attract the attention of surrounding unconnected people. Accordingly, an intruder may now continue with the unauthorised access in the knowledge that the alarm may not attract the attention of any unconnected people. In addition, the property may be located in a remote position with few, if any, surrounding people.

Many people now simply assume that an alarm is a false alarm and will not necessarily act on the triggering of an alarm system. This may be particularly relevant if such an alarm system has previously been triggered with a false alarm situation.

Accordingly, such alarm systems must be very robust to prevent false alarms and/or the alarm signal must be transmitted to the responsible person or surveillance person. Such people may be located remote from the location and a transmission method will therefore be required.

The detectors in an alarm system may be configured to show the status of a door or window and may confirm whether the window/door is open or closed. Such window and door sensors generally comprise a proximity sensor which will alert the user as to whether the door or window sash is located adjacent to the relative frame and thereby in a closed position. Alternatively, the detector may be arranged to show that the handle of the window is in the closed position to provide an indication that the window is secure.

However, there is a risk of an incorrect status being interpreted from the results of the detector in that the window may not actually be in a secured position even though the alarm system through the relevant detector shows that it is closed/locked/secured.

It is an aim of the present invention to overcome at least one problem associated with the prior art whether referred to herein or otherwise.

SUMMARY OF THE INVENTION

According to a first aspect of the present invention there is provided a casement window locking assembly comprising:

a locking handle;

a housing;

a locking bar; and a coupling member to transfer movement of the locking handle to the locking bar;

wherein the locking handle is movable between a locked position and an unlocked position, the locking handle being arranged to be mounted to part of a casement window assembly comprising a window frame having a window sash movably mounted therein, the casement window locking assembly comprising a sensor system to indicate if the window sash is closed within the window frame and also if the window handle is in a locked position, the sensor system comprising:

a first sensor and a second sensor, the first sensor comprising a first handle component secured to the coupling member and a second handle component mounted within the housing in order to detect the locking handle being in a locked position, the second sensor comprising a first window component mounted in the housing and a second window component being arranged to be mounted on the window sash in order to detect the window sash being located in a closed position.

Preferably the first handle component is mounted on a mounting member secured to the coupling member. The mounting member may provide a receiving portion to receive the first handle component. The receiving portion may comprise a border or boundary member defining a receiving portion.

Preferably the mounting member is arranged to be removably secured to the coupling member.

The mounting member may comprise a clip.

Preferably the mounting member comprises a resilient clip and the clip may naturally engage around at least a part of a periphery of the coupling member. Preferably, once secured, the mounting member is constrained to move with the coupling member.

Preferably the mounting member comprises a first portion and a second portion. The first portion may comprise a mounting portion and the second portion may comprise a retaining portion.

The mounting portion and the retaining portion may inter-engage to encompass a part of the coupling member and a combination of the two portions may provide a contiguous surrounding member which extends around a periphery of the coupling member.

Preferably the coupling member and the mounting member comprises locating means to respectively locate and retain the secured positons of the two members in the secured position.

The retaining portion may comprise at least one locating lug which is arranged to locate within a corresponding recess/detent provided on the coupling member. Preferably the retaining portion may comprise two locating lugs each of which is arranged to locate within a corresponding recess/detent.

The coupling member may comprise a fork member. The fork member may comprise a first leg and a second leg which define a gap therebetween.

The locking bar may have a control member located thereon.

The control member may comprise a lug which may comprises a mushroom headed lug.

Preferably the control member is arranged to be engaged in the gap defined between the legs of the fork member.

The locking bar may comprise an elongate locking bar comprising a plurality of locking pins located thereon. The locking pins are longitudinally spaced apart on the locking bar and each locking pin is arranged to be engaged in a respective striker/keep. Each locking pin may comprise a mushroom headed pin.

Preferably each sensor comprises a proximity sensor.

Preferably each sensor comprises a magnet and a reed switch.

The or each magnet may comprise a neodymium magnet.

The first sensor may comprise a single magnet.

The first sensor may comprise two reed switches. The first sensor may comprise four reed switches.

Preferably the first handle component comprises a magnet.

The second handle component may comprises a reed switch.

The first sensor may comprise a third handle component. The second handle component may be activated by the first handle component to indicate the locking handle is in a locked position and the third handle component may be activated by the first handle component to indicate that the locking handle is in an unlocked position.

The casement window locking assembly may comprise a third handle component. The third handle component may detect a further position of the locking handle and preferably detects an unlocked position of the locking handle.

The third handle component may comprise a reed switch.

The second handle component and the third handle component may be mounted on a board. The board may be located within the housing.

The board may comprise a printed circuit board.

The board may have a slot defined therein and preferably comprises a closed slot spaced from the periphery of the board.

The coupling member may be arranged to slidably move within the slot. The coupling member may be constrained to slide within the slot. The locking handle may locate on a first side of the board and the locking bar may locate on a second side of the board.

The second handle component may be located at or towards a first end of the slot and the third handle component may be located at or towards a second end of the slot. The second and third handle components may locate adjacent to one lateral side of the slot.

The casement window locking assembly may comprise an auxiliary first sensor.

The window casement locking assembly may comprise an auxiliary second handle component which may supplement a main second handle component and the window casement locking assembly may therefore comprise two second handle components.

The auxiliary second handle component may be identical to the main second handle component but mounted oppositely such that one component is for use with a left hand mounted window sash and one component is for use with a right hand mounted window sash.

The mounting member may be arranged to secure the first handle component on either side of the coupling member.

The casement window locking assembly may comprise a main second handle component and an auxiliary second handle component and only one of which may be arranged to cooperate with the first handle component depending upon a side of the coupling member to which the first handle component is mounted.

The second window handle component may detect a locked position for the locking handle. Each second window handle component may detect a locked position for the locking handle.

The first sensor may comprise two third handle components.

The window casement locking assembly may comprise an auxiliary third handle component which may supplement a main third handle component and the window casement locking assembly may therefore comprise two third handle components.

The auxiliary third handle component may be identical to the main third handle component but mounted oppositely such that one component is for use with a left hand mounted window sash and one component is for use with a right hand mounted window sash.

The mounting member may be arranged to secure the first handle component on either side of the coupling member.

The casement window locking assembly may comprise a main third handle component and an auxiliary third handle component and only one of which may be arranged to cooperate with the first handle component depending upon a side of the coupling member to which the first handle component is mounted.

The third window handle component may detect an unlocked position for the locking handle. Each third window handle component may detect an unlocked position for the locking handle.

The second sensor may comprise a proximity sensor comprising a magnet and a reed switch.

The first window component may comprise a reed switch and the second window component may comprise a magnet.

The casement window handle may comprise communication means to communicate signals from each sensor to a remote unit. Preferably the communication means comprises a Bluetooth communication means.

The communication means may be arranged to be connected to a control hub (control means). The control hub (control means) may be connected to a router in order to further communicate the signal from the casement window handle.

The signals may be communicated directly (or indirectly through the hub) to a smart phone.

The control means (control hub) may combine the signals received from each sensor to determine if the window sash is in a secure status or an unsecured status. The secured status may be identified when the sensors indicate that the window sash is closed within the window frame and the locking handle/locking bar is in a locked position. The unsecured status may be identified when either the window sash is open within the window frame or the locking handle is in the unlocked position or both.

The housing may comprise power means. The power means may comprise a battery.

The housing may contain transmission means and preferably comprises a Bluetooth transmitter.

The housing may comprise a self-contained unit which includes the sensor components (excluding the second window component), transmission means and power means.

According to a second aspect of the present invention there is provided a casement window assembly comprising a window sash, a window frame and a casement window locking assembly comprising: a casement window locking assembly comprising:

a locking handle;

a housing;

a locking bar; and a coupling member to transfer movement of the locking handle to the locking bar;

wherein the locking handle is movable between a locked position and an unlocked position, the locking handle being arranged to be mounted to part of a casement window assembly comprising a window frame having a window sash movably mounted therein, the casement window locking assembly comprising a sensor system to indicate if the window sash is closed within the window frame and also if the window handle is in a locked position, the sensor system comprising:

a first sensor and a second sensor, the first sensor comprising a first handle component secured to the coupling member and a second handle component mounted within the housing in order to detect the locking handle being in a locked position, the second sensor comprising a first window component mounted in the housing and a second window component being arranged to be mounted on the window sash in order to detect the window sash being located in a closed position.

According to a third aspect of the present invention there is provided a home automation system comprising at least one window status sensor system for monitoring a window including a casement window locking assembly, the casement window locking assembly comprising:

a locking handle;

a housing;

a locking bar; and a coupling member to transfer movement of the locking handle to the locking bar;

wherein the locking handle is movable between a locked position and an unlocked position, the locking handle being arranged to be mounted to part of a casement window assembly comprising a window frame having a window sash movably mounted therein, the casement window locking assembly comprising a sensor system to indicate if the window sash is closed within the window frame and also if the window handle is in a locked position, the sensor system comprising:

a first sensor and a second sensor, the first sensor comprising a first handle component secured to the coupling member and a second handle component mounted within the housing in order to detect the locking handle being in a locked position, the second sensor comprising a first window component mounted in the housing and a second window component being arranged to be mounted on the window sash in order to detect the window sash being located in a closed position.

According to a fourth aspect of the present invention there is provided a method of providing a window status sensor system, in which a window includes a casement window locking assembly, the casement window locking assembly comprising:

a locking handle;

a housing;

a locking bar; and a coupling member to transfer movement of the locking handle to the locking bar;

wherein the locking handle is movable between a locked position and an unlocked position, the locking handle being arranged to be mounted to part of a casement window assembly comprising a window frame having a window sash movably mounted therein, the casement window locking assembly comprising a sensor system to indicate if the window sash is closed within the window frame and also if the window handle is in a locked position, the sensor system comprising:

a first sensor and a second sensor, the first sensor comprising a first handle component secured to the coupling member and a second handle component mounted within the housing, the second sensor comprising a first window component mounted in the housing and a second window component being arranged to be mounted on the window sash, the method comprising using the first sensor to detect the locking handle being in a locked position and using the second sensor to detect the window sash being in the closed position.

According to a fifth aspect of the present invention there is provided a casement window locking assembly comprising:

a locking handle;

a housing;

a locking bar; and a coupling member to transfer movement of the locking handle to the locking bar;

wherein the locking handle is movable between a locked position and an unlocked position, the locking handle being arranged to be mounted to part of a casement window assembly comprising a window frame having a window sash movably mounted therein, the casement window locking assembly comprising a sensor system to indicate if the window handle is in a locked position, the sensor system comprising:

a first sensor, the first sensor comprising a first handle component secured to the coupling member and a second handle component mounted within the housing in order to detect the locking handle being in a locked position.

BRIEF DESCRIPTION OF THE DRAWINGS

The present invention will now be described by way of example of only, with reference to the drawings that follow, in which.

DESCRIPTION OF THE PREFERRED EMBODIMENTS

Figure 1:
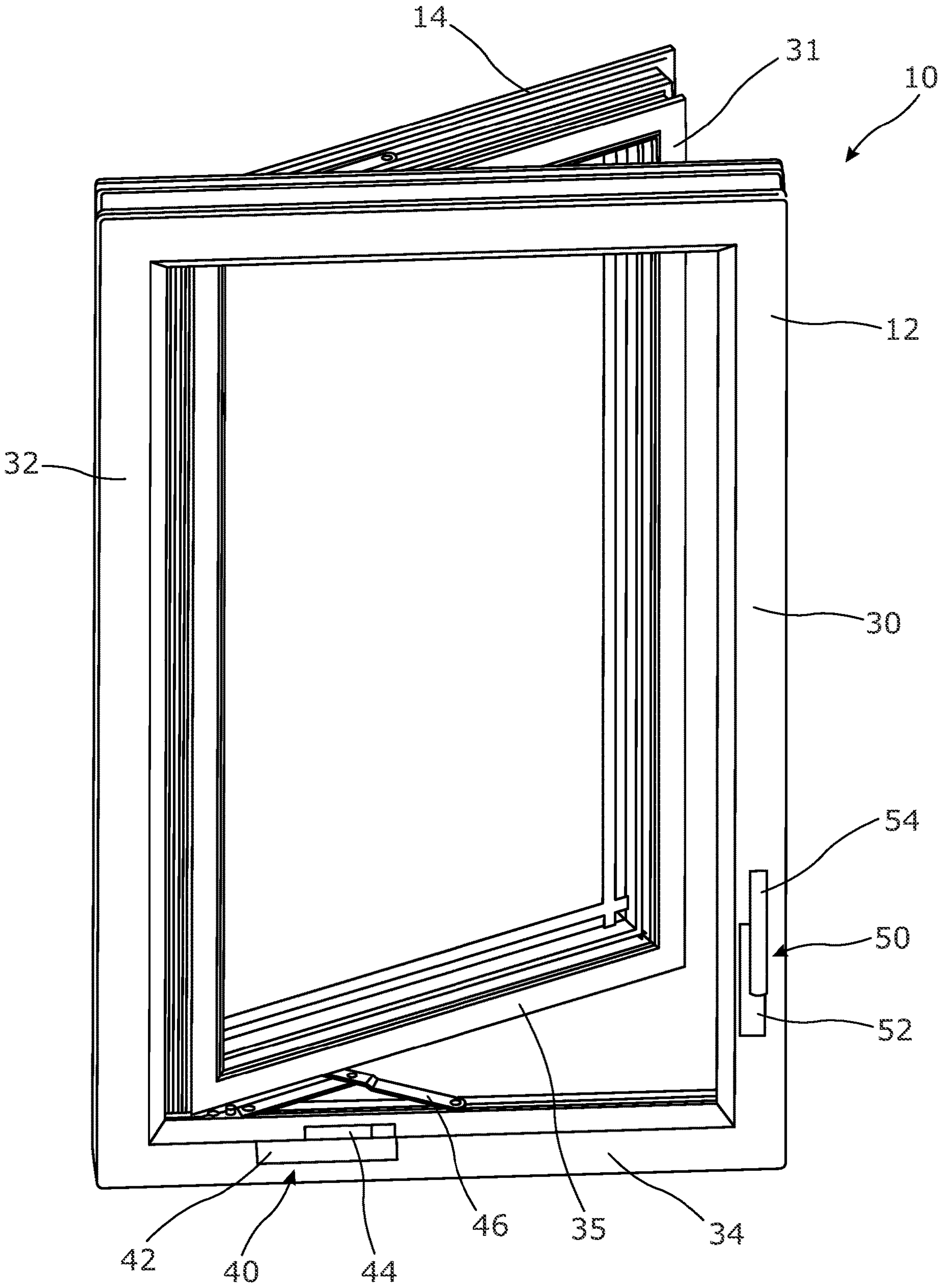
FIG. 1 is a perspective view of a casement window in an open and unlocked position showing schematic representations of a locking handle assembly and a crank handle assembly.
Figure 2:
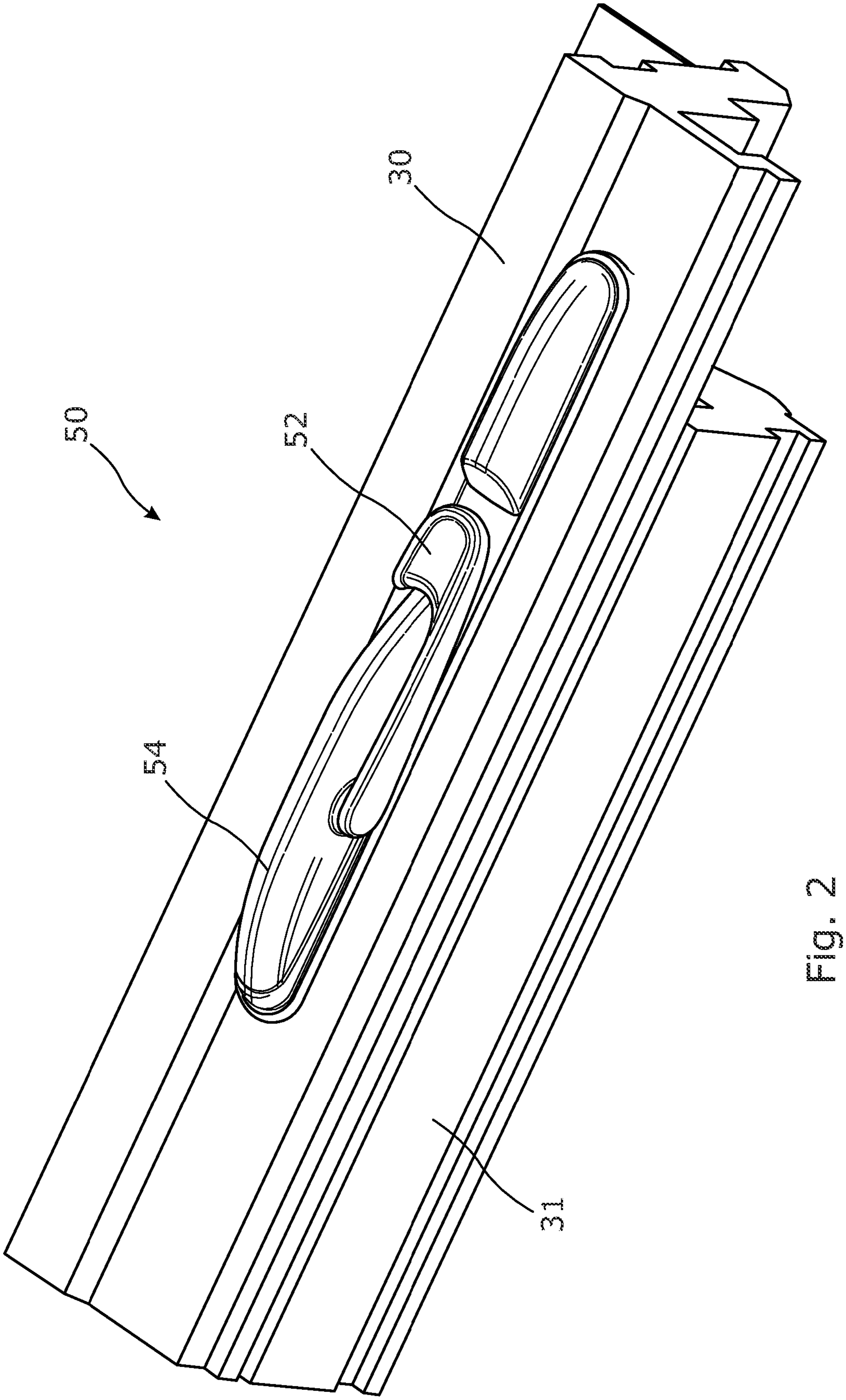
FIG. 2 is a perspective view of a preferred embodiment of a window casement locking handle assembly located on a window frame.
Figure 3:
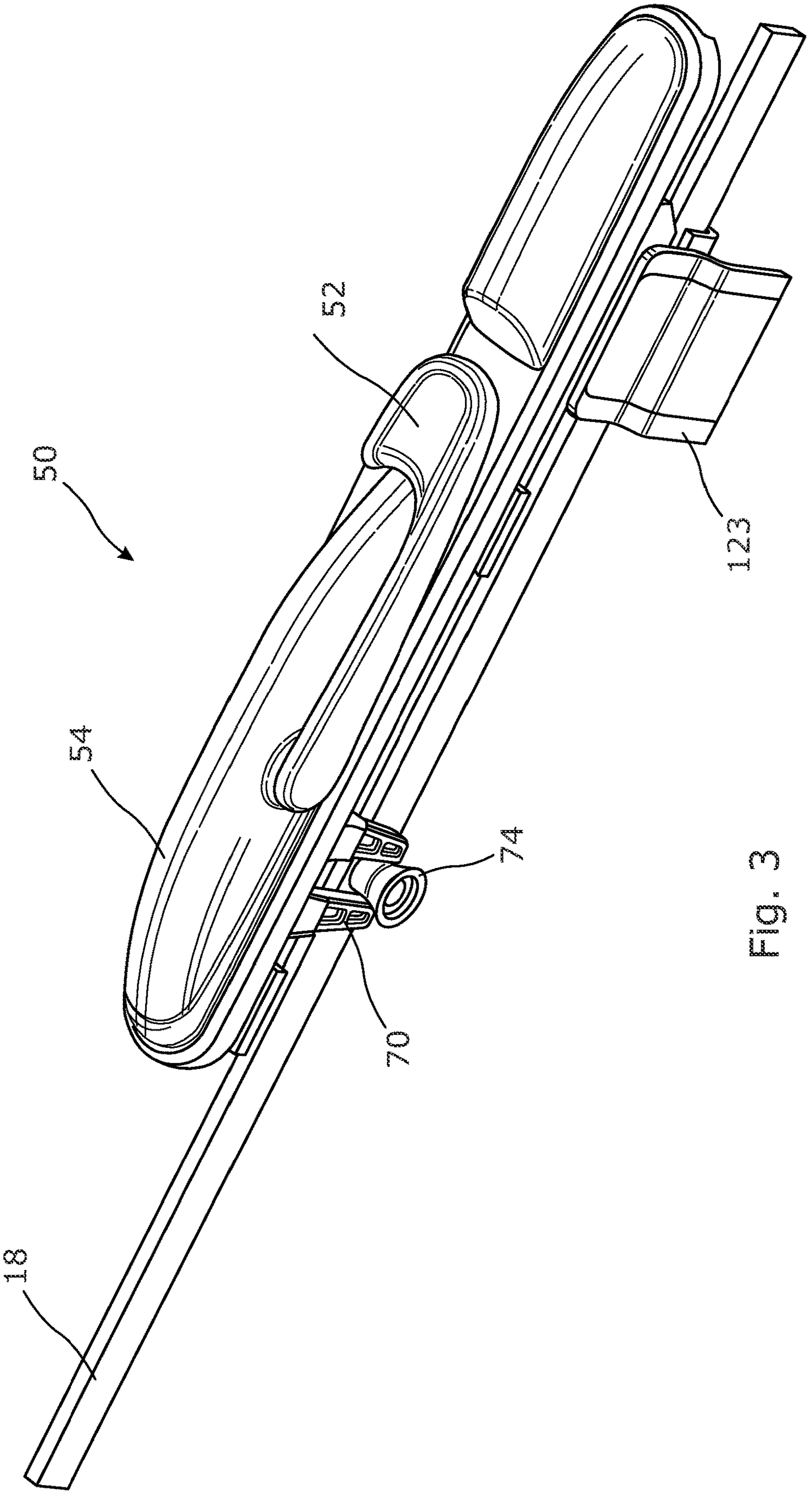
FIG. 3 is a perspective view of a preferred embodiment of a window casement locking handle assembly.
Figure 4:
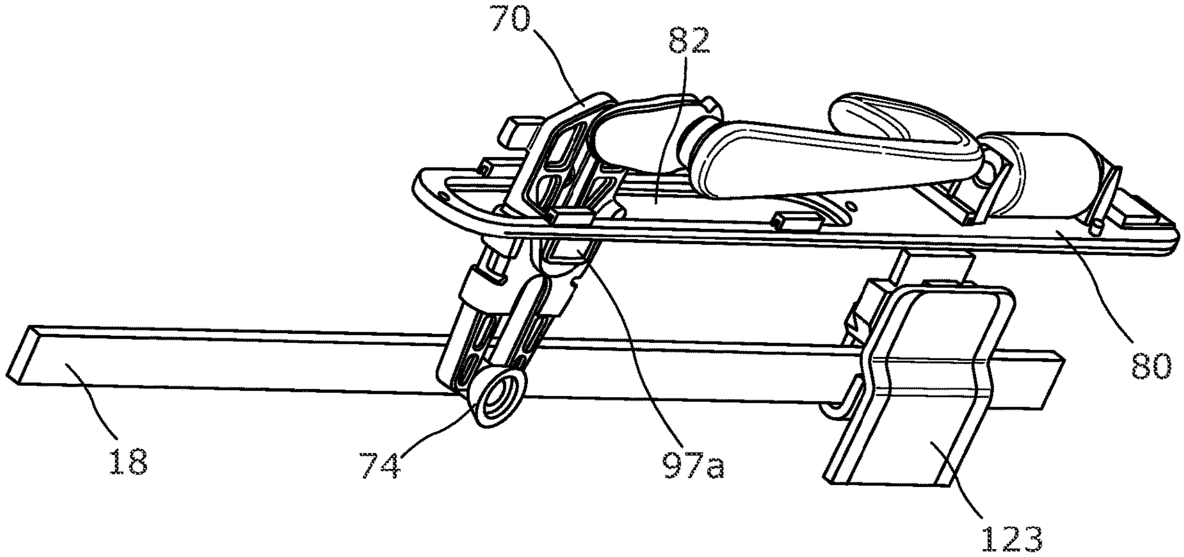
FIG. 4 is a perspective view of a preferred embodiment of a window casement locking handle assembly with the housing removed.
Figure 5:
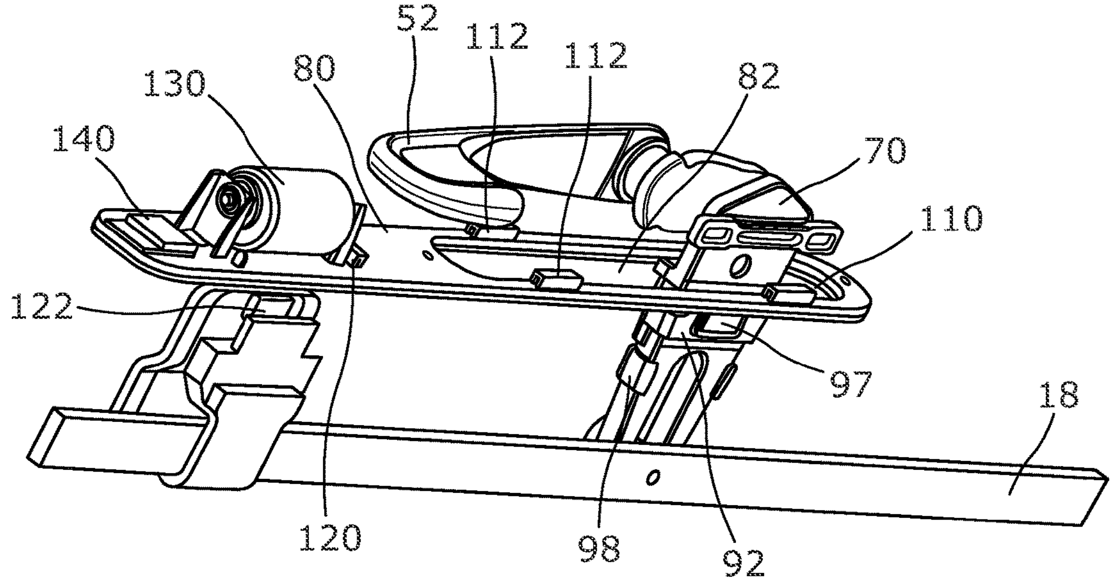
FIG. 5 is a perspective view of a preferred embodiment of a window casement locking handle assembly with the housing removed.
Figure 6:
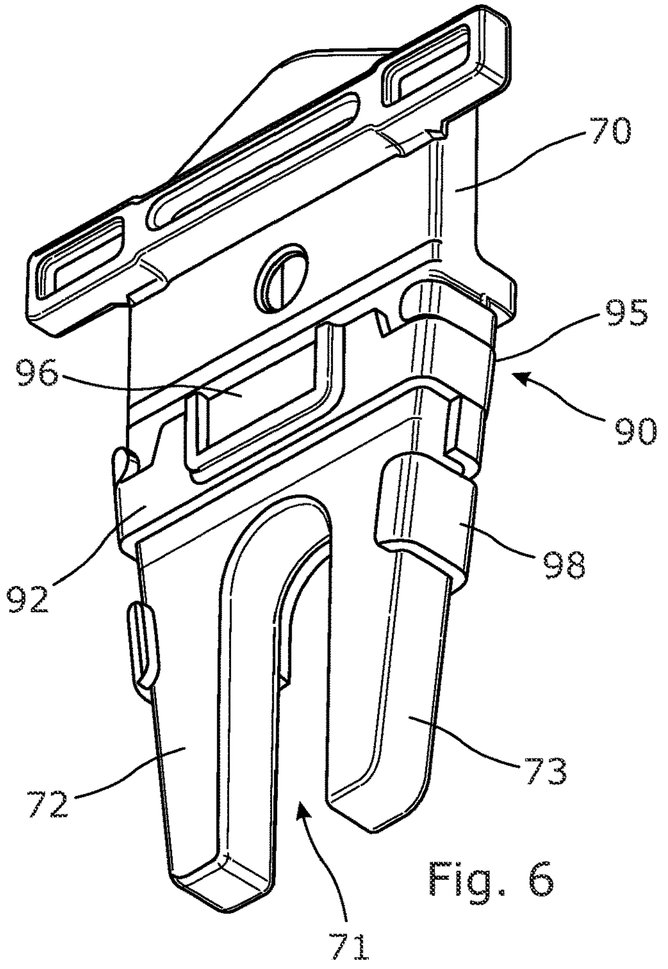
FIG. 6 is a perspective view of a coupling member with a preferred embodiment of a mounting member secured thereto.
Figure 7:
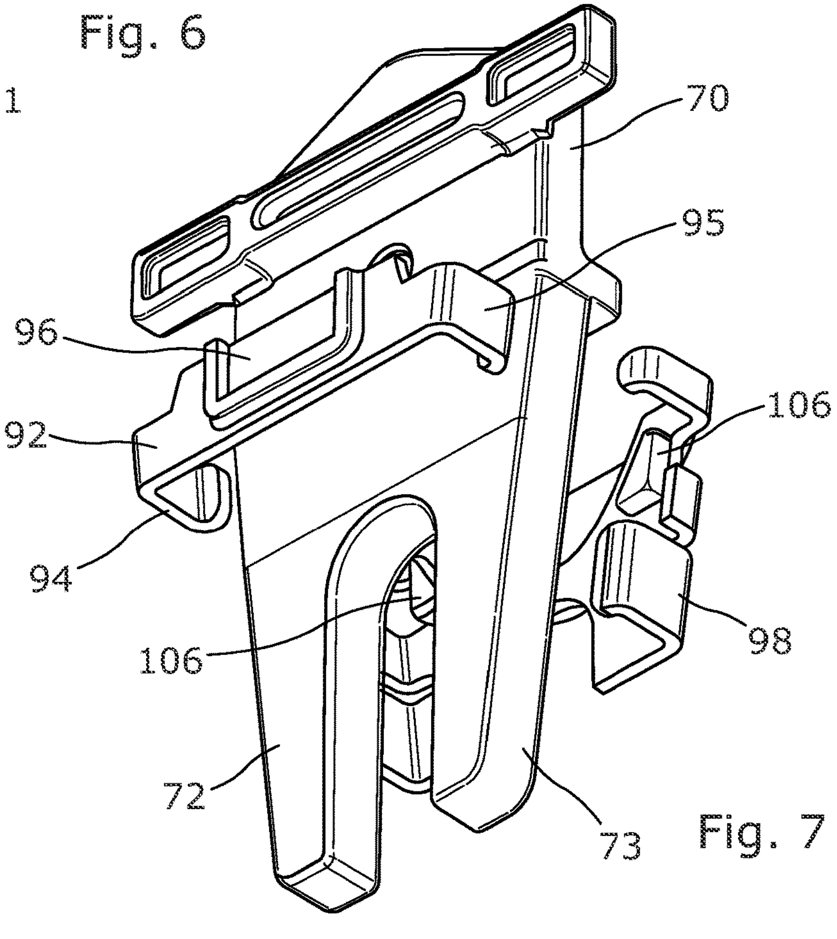
FIG. 7 is an exploded perspective view of a coupling member and a preferred embodiment of a mounting member.
Figure 8:
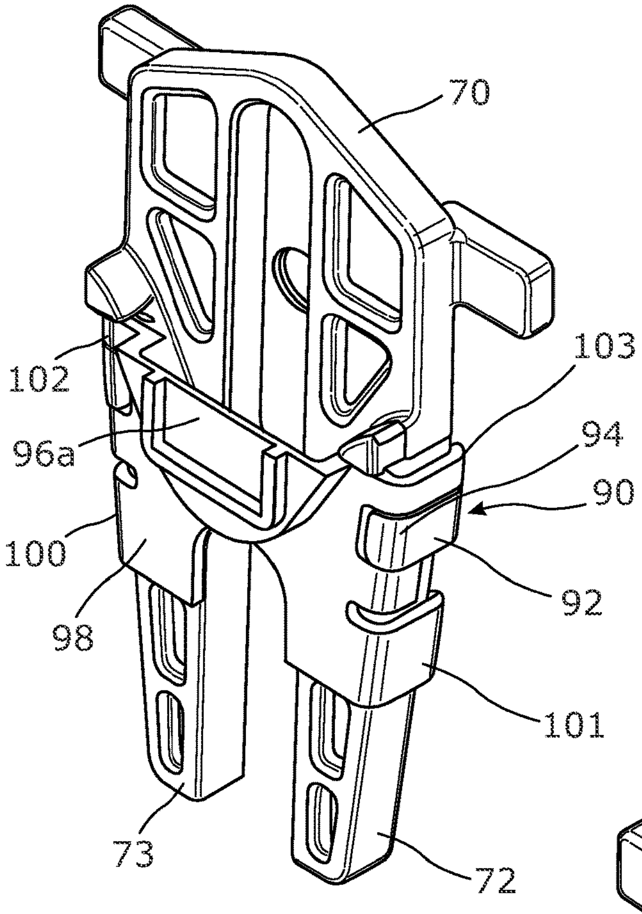
FIG. 8 is another perspective view of a coupling member with a preferred embodiment of a mounting member secured thereto.
Figure 9:
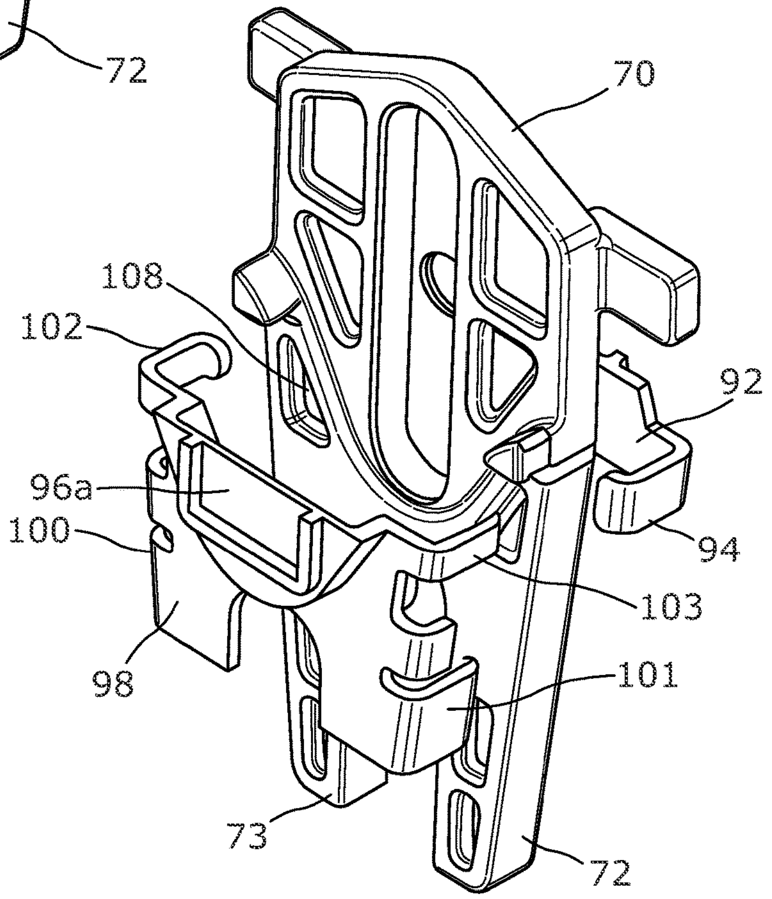
FIG. 9 is another exploded perspective view of a coupling member and a preferred embodiment of a mounting member.
Figure 10:
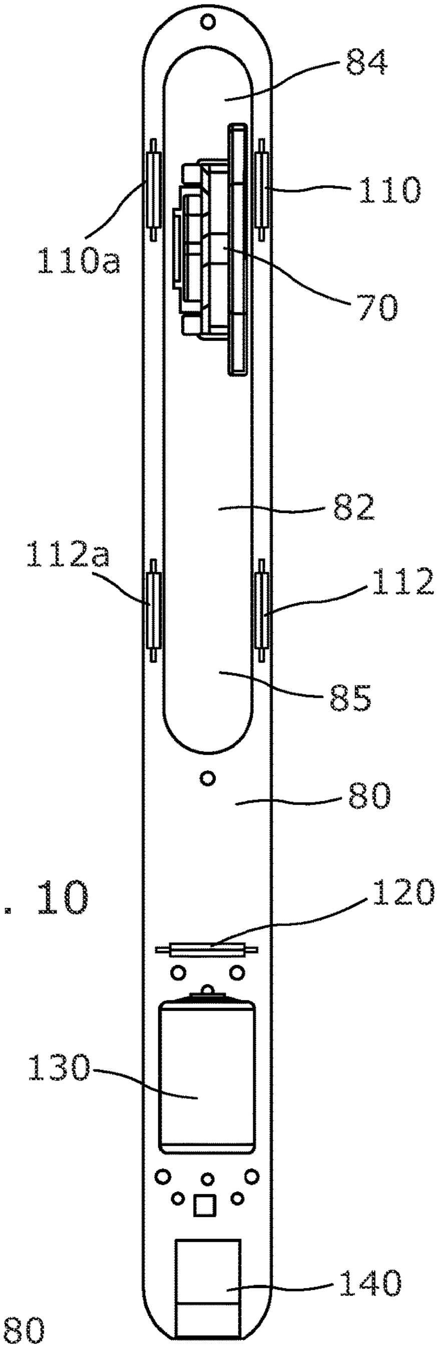
FIG. 10 is an internal plan view of part of a preferred embodiment of a window casement locking handle assembly.
Figure 11:
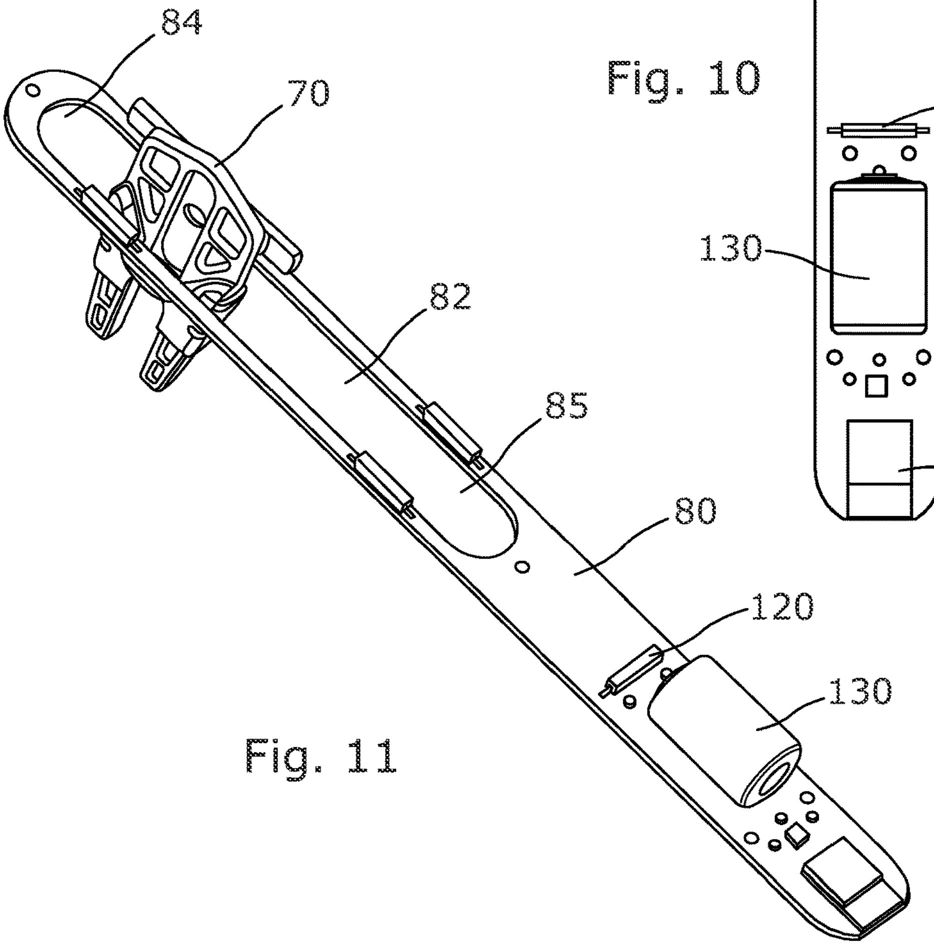
FIG. 11 is a perspective view of part of a preferred embodiment of a window casement locking handle assembly.
Figure 12:
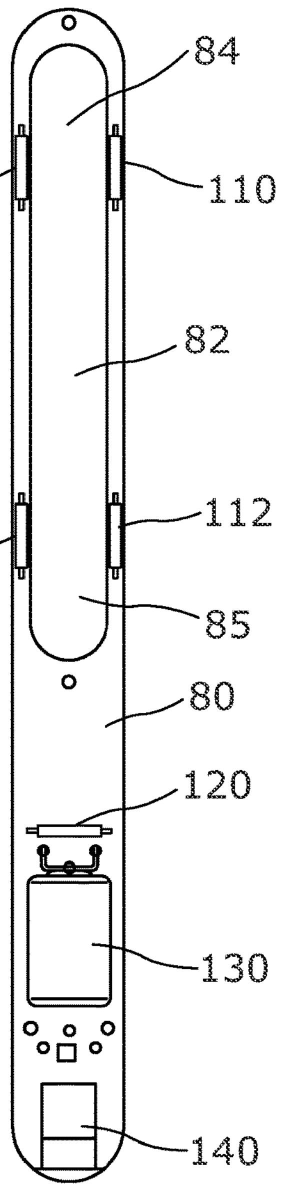
FIG. 12 is an internal plan view of part of a preferred embodiment of a window casement locking handle assembly.
Figure 13:
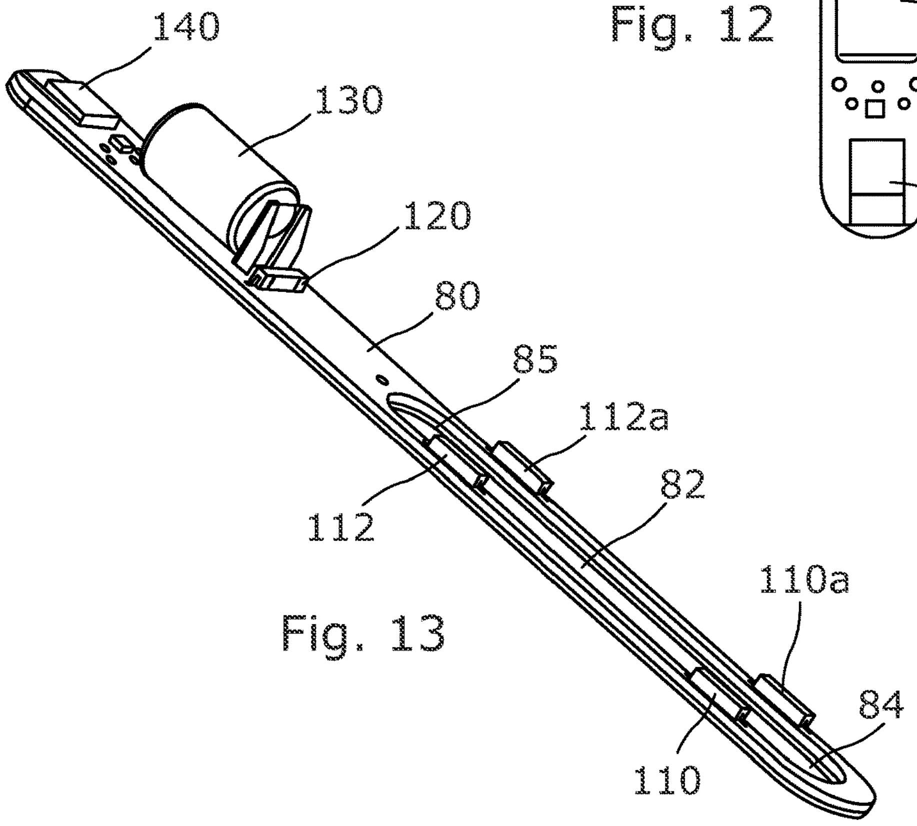
FIG. 13 is a perspective view of part of a preferred embodiment of a window casement locking handle assembly.

As shown in FIG. 1, a typical casement window 10 comprises a window frame 12 and a pivotally mounted window sash 14. The casement window 10 has hinges in order to pivotally mount the window sash 14 in the window frame 12. The hinges are configured to enable the window to pivot about a vertical axis such that the window sash 14 is retained in a vertical plane. Accordingly, the window sash 14 is arranged to open outwardly from one side of the window frame 12. However, it will be appreciated that the casement window locking bar sensor system of the present invention could be used with other suitable types and styles of windows.

As shown in FIG. 1 to FIG. 5, the casement window 10 includes a locking mechanism 50 in order to lock the window, i.e. to lock the window sash 14 to the window frame 12 in a closed position. The locking mechanism 50 comprises a locking handle 52 which is coupled to a locking rod 18 and such a locking mechanism 50 comprises an espagnolette locking device. The locking rod 18 locates in a groove provided along an edge of the window frame 12.

In particular, the locking rod 18 locates within a groove in a side 30 of the window frame 12 which is opposite to the side 32 of the frame 12 in which the pivot mechanism is arranged. The lock bar 18 may comprise a stainless steel lock bar 18 which provides a variety of lock-point configurations. The lock bar 18 may be generally a planar bar which may be a stamped out bar. In addition, the lock bar 18 may have guides which are pre-assembled to the lock bar 18.

In one preferred embodiment, the window sash 14 is arranged to pivot about a first lateral side window frame member 32 and an outer frame member 31 of the window sash 14 is arranged to be locked by the locking mechanism to the second lateral side window frame member 30. The lower frame/sash members 34, 35 of the window frame/window sash 12, 14 may incorporate a rotating handle/crank handle mechanism 40 (winder handle mechanism) in order for a user to pivot the window sash 14 between the open and closed position. This rotating handle/crank handle mechanism 40 may move a connecting lever system 46 to move the window sash 14 towards and away from the window fame 12.

The locking mechanism 50 may or may not require a dedicated key and the use of such a dedicated key is seen as a secondary lock mechanism, i.e. the term “lock” in accordance with the present invention equates to retained/secured/engaged such that the window may still be openable without the use of a key. However, in some embodiments a key may be required and this provides a further level of security. In particular, the key locking mechanism may (directly) prevent rotation of the locking handle and this thereby prevents the window from being opened.

The locking mechanism 50 includes a locking handle 52 and a housing 54 which may only be mounted internally (i.e. no external locking handle) and, therefore, when the window is closed 10 and the espagnolette locking rod 18 engaged, this effectively locks the window 10 and prevents a person from opening the window 10 from outside. The locking handle 52 is arranged to be pivotally moved about the housing 54 from a downwards direction, in which the locking mechanism 50 is in a locked position, to an upwards direction, in which the locking mechanism 50 is in an unlocked position. The pivotal movement of the handle 52 is transmitted to a sliding movement of the locking bar 18 as will be described later.

The locking handle 52 is mounted to the inside of the frame member 30 of the window frame 12. The locking handle 52 is coupled to the locking rod 18 by a coupling mechanism such that the pivotal/rotational movement of the locking handle 12 causes translational movement of the locking rod 18. The locking rod 18 is located in a groove in the frame member 30 of the window frame 12 and the locking rod 18 is retained to slidably move up and down this groove.

The locking rod 18 has a number of locking elements comprising locking lugs, lock pins which are arranged to project outwardly from the locking rod 18. These locking lugs/lock pins may comprise locking bolts or locking pegs or lock pins etc. In particular, the lock pins may comprise mushroom head lock pins. These lock pins prevent the lock from disengaging from the strikers mounted to the window sash 14. The lock pins may also be adjustable to control the compression levels (after installation).

The movement of the locking rod 18 thereby causes movement of these locking lugs/pins upwardly and downwardly relative to the window sash 14 and the window frame 12.

The locking mechanism 50 further includes keeps (or strikers/nylon strikers) which are arranged to accept and retain the locking lugs in the locked configuration. In particular, each keep includes at least one locking slot (or a ramp/recessed portion etc.) into which a locking lug can be slidably moved. As mentioned above, this movement is caused through the action of the pivoting/rotation of the locking handle 52 causing the translational movement of the locking rod 18.

When the casement window 10 is in a closed but unlocked position, the locking lugs are disengaged with the locking slots of a respective keep. In order to lock the window 10, the locking handle 52 is rotated and the locking rod 18 is slidably moved in order to move the locking lugs into respective locking slots within a keep. In this configuration, the window sash 14 is both closed and locked, i.e. a user could not operate the crank handle 44 or push the window sash 14 in order to open the window 10. The casement window 10 may be provided with a key mechanism in order to actively lock the casement window 10 in this configuration. In particular, the locking handle 52 may have a key locking mechanism to prevent rotation of the handle 52 unless the key has unlocked this mechanism.

Prior art sensor systems are available to detect whether a window 10 is open or closed. However, unfortunately, many windows 110 may simply be closed without the locking mechanism having been correctly set. For example, a window sash 14 may simply be pushed or moved to a closed position such that the locking lugs are not actually engaged in the locking slots. Such windows 10 have the appearance (i.e. by a visual inspection or by a prior art simple sensor system) of being correctly shut but the window 10 is not actually locked. Accordingly, such signals give a false representation of the protection offered by the status of the window.

The present invention provides a sensor system which provides positive feedback on the position of the locking bar 18 and the position of the window sash 14. In particular, the present invention provides a signal concerning the position of the window sash 14 and also the position of the locking bar 18. Accordingly, a user will know that the window 10 is actually closed and locked rather than being merely in a closed position or merely with the locking bar 18 in a locked position.

The casement window locking bar sensor detects and monitors the actual positions of both the locking bar 18 and the window sash 14 rather than just monitoring the position of the window sash 14. Accordingly, this feedback provides positive reassurance that the locking lugs are actually in an engaged/locked position.

The casement window 10 comprises a locking handle 52 and a mounting base or housing 54 which is arranged to mount the assembly on the window frame 12 of a casement window 10 wherein the window sash 14 is pivotally mounted along one side to the window frame 12. The locking handle 52 is movable relative to the mounting base 54 between an open position and a closed position.

The window sash 14 is movable relative to the window frame 12 between an open position and a closed position and, in particular, pivots along one edge. For example, the window sash may pivot along a first side (lateral) edge 32 with the locking handle assembly 50 being mounted on the opposite side 30 on the window frame 12. Alternatively, the window sash 14 may be pivotally mounted in the window frame 12 along an upper edge with the locking handle assembly 50 being mounted along a lower edge of the window frame 12. However, it will be appreciated that other arrangements may also be suitable.

As mentioned above, the window frame 12 includes a locking mechanism such as an espagnolette mechanism which may be located along an adjacent side of the window frame 12 to which the crank handle assembly 40 is mounted. The crank handle assembly 40 or winder assembly comprises a crank handle 44 or winder rotatably mounted on a housing 42. The espagnolette locking mechanism includes locking members which are slidably moved into and out of a locking position are arranged to move into a locking recess provided by the window sash 14 in order to lock the window in a closed position. The locking handle 52 is pivotally mounted and moves from a first position to a second position in order to move the locking members into and out of engagement with the window sash 14. The locking handle 52 is secured to a spindle and coupling means which extend between the locking handle 52 and the espagnolette locking mechanism such that pivotal (rotational) movement of the locking handle 52 to a locked position will be arranged to move the locking lugs or strikers to the locked position.

Accordingly, the locking handle 52 is arranged to securely lock the window sash 14 in a closed positon relative to the window frame 12. The casement window locking handle assembly 50 is located internally and prevents unauthorised access therethrough.

The locking handle assembly 50 comprises a coupling means to transfer the pivotal movement of the locking handle to translational movement of the locking rod 18. The coupling means comprises a coupling member and, in the preferred embodiment, the coupling member comprises a fork member 70.

As shown in FIG. 6 to FIG. 9, the fork member 70 comprises two legs 72, 73 which defines a gap 71 therebetween. The two legs 72, 73 are arranged to locate either side of a part/roller/stud 74 of the locking rod 18 (see FIG. 3 and FIG. 4). In particular, the locking rod 18 may comprises a lug 74 or stud which projects outwardly from a side of the locking rod 18. This lug is thereby constrained in the gap 71 defined between the two legs 72, 73 of the fork member 70. Movement of the fork 70 thereby causes corresponding movement of the lug 74 and hence the locking rod 18.

An upper end of the fork member 70 is connected to the handle 52 such that rotational movement of the handle 52 causes translational movement of the fork member 70 within the housing 54. As shown in FIG. 4, FIG. 5 and FIGS. 10 to 13, the housing 54 contains a printed circuit board 80 which includes a slot 82 through which the fork member 70 extends. Accordingly, the fork member 70 is arranged (and constrained) to translationally move within this slot 82 from a first end 84 to a second end 85.

When the fork member 70 is located at or towards the first end 84 of the slot 82 the locking rod 18 is in a locked position and when the fork member 70 is at or towards the second end 85 of the slot 82, the locking rod 18 is in an unlocked position. As mentioned above, the locking rod 18 has a number of locking lugs/pins projecting outwardly therefrom which are longitudinally spaced along the locking rod 18. Each of the locking lugs/pins 18 is arranged to be engaged within a respective keep/strike provided in the window sash 14 in order to lock the window sash 14 to the window frame 12.

The present invention provides a sensor system to identify whether the locking rod 18 is in the locked position and/or when the locking rod 18 is in an unlocked position. More specifically, the sensor system identifies the position of the fork member 70 within the slot 82.

The preferred embodiment of the present invention comprises a first proximity sensor device to determine whether the locking bar 18 is in the locked position, a second proximity sensor device to determine whether the locking bar 18 is in an unlocked position and a third proximity sensor to determine whether the window sash 14 is in a closed position within the window frame 12. Each of these proximity sensor devices comprises a first component and a second component to detect a relatively close proximity between the two components. In the preferred embodiment, the proximity sensor devices comprises a magnet and a reed switch which are mounted on respective components for which the relative position (proximity) is to be detected.

The present invention comprises a mounting member 90 which is arranged to be secured to the fork member 70. In particular, the mounting member 90 comprises a clip which can be quickly and easily secured around the fork member 70 without interfering with the operation and/or movement of the fork member 70. The present invention provides a system which can be retrospectively fitted to an existing window assembly. In order to achieve this, the mounting member 90 is arranged to be secured to the coupling member 70 of the existing window assembly.

The mounting member 90 comprises a clip which may be in the form of an incomplete ring or sleeve and/or in the form of inter-engaging incomplete rings or sleeves. The clip comprises a mounting portion 92 and two engaging legs 94, 95. The natural resilience in the clip provides a gripping force to secure the clip to the fork member 70 in a designated and predetermined position.

The mounting portion 92 is arranged to locate adjacent to one side (a first lateral side) of the fork member 70 and provides a face on which a first sensor member is mounted. The face includes a recess 96 or peripheral wall (receiving portion) into which a magnet 97 is located. In particular, the magnet 97 is secured by an adhesive within the recess 96.

Accordingly the magnet 97 will move within the housing 54 along with the fork member 70.

The two legs 94, 95 or engaging portions extend from the mounting portion 94 and are arranged to extend respectively along the front and back of the fork member 70. The ends of the legs 94, 95 are angled to extend partially on to the second lateral face of the fork member 70.

In use, the fork member 70 can be inserted into the gripping area defined by the clip until the mounting member 92 locates at least partially around each face of the fork member 70. The clip is resilient and provides sufficient gripping force to be mounted around the fork member 70.

The mounting member 90 further comprises a retaining portion 98 which aids the positional securement of the mounting portion 92 on the fork member 70. The retaining portion 98 is similar to the mounting portion 92 in that there are engagement legs 100, 101 which extend around the body of the fork member 70. In the preferred embodiment, the retaining portion 98 includes two pairs of legs 100, 101, 102, 103 with an upper pair 102, 103 and a lower pair 100, 101. The retaining portion 98 is arranged to be secured from the opposite face of the fork member 70 compared to the mounting portion 92. The mounting portion 92 and the retaining portion 98 thereby generally locate on opposing lateral faces of the fork member 70.

The engagement legs 94, 95 of the mounting portion 92 are arranged to locate between the respective upper and lower engagement legs 100, 101, 102, 103 of the retaining portion 98.

The retaining portion 98 (and/or mounting portion 92) is provided with inward facing projections 106 which are arranged to engage within corresponding recesses or detents 108 provided on the fork member 70.

The retaining portion 98 may also provide a mounting face on which the first sensor member is mounted. The face includes a recess 96*a* or peripheral wall into which a magnet 97*a* is located. In particular, the magnet 97*a* is secured by an adhesive within the recess 96*a*. Accordingly the magnet 97*a* will move within the housing 54 along with the fork member 70. In use, only a single magnet may be required and provided. Each of the mounting portion 92 and the retaining portion 98 are interchangeable and one or both may include a magnet 97, 97*a* mounted thereto.

The casement window locking bar sensor includes a second or locked sensor member which is arranged to cooperate with the first sensor member (magnet 97, 97*a*) located on the fork member 70. The locked sensor member comprises a reed switch 110, 110*a* which is statically located and fixed within the housing 54. In particular, the second sensor member comprises a reed switch 110 mounted on the PCB 80. The reed switch 110 is mounted at or towards the first end 84 of the slot 82 to indicate a locked position.

In the locked position, the fork member 70 is located at or towards the first end 84 of the slot 82 and the magnet 97 thereby operates the reed switch 110. This may either open the reed switch 110 or close the reed switch 110 depending upon the type of reed switch used. This cooperation will indicate and signal that the fork member 70 is in the locked position which thereby demonstrates that the locking bar 18 is also in the locked position.

In some embodiments of the present invention, the sensor system includes a second reed switch 110*a* to detect the fork member 70 being in the locked position. The second locked reed switch 110*a* is mounted on the PCB 80 on the opposite side of the slot 82 to the first locked reed switch 110. This second reed switch 110*a* may cooperate with the second magnet 97*a* which may be mounted on the fork member 70. Alternatively, the fork member 70 may only have a single magnet 97*a* mounted on this second lateral/side face which will thereby reliably operate this reed switch 110*a*. The use of a pair of reed switches 110, 110*a* in the locked positon accommodates the mounting of the magnet 97, 97*a* on the fork member 70 on either face and also aids the use of the present invention with both left and right handed systems.

The casement window locking bar sensor includes a further sensor member (unlocked sensor member) which his arranged to cooperate with the first sensor member (magnet 97) located on the fork member 70. The unlocked sensor member comprises a reed switch 112 is statically located and fixed within the housing 54. In particular, the unlocked sensor member comprises a reed switch 112 mounted on the PCB 80. The reed switch 112 is mounted at or towards the second end 85 of the slot 82 to indicate an unlocked position.

In the unlocked position, the fork member 70 is located at or towards the second end 85 of the slot 82 and the magnet(s) 97, 97*a* mounted on the fork member 70 thereby operates the reed switch 112. This may either open the reed switch 112 or close the reed switch 112 depending upon the type of reed switch used. This cooperation will indicate and signal that the fork member 70 is in the unlocked position which thereby demonstrates that the locking bar 18 is also in the unlocked position.

It will be appreciated, that in the unlocked position the magnetic field from the magnet 97, 97*a* is not sufficient to operate (change the default/neutral state) of the locked reed switch(es) 110, 110*a*. Similarly, in the locked position, the magnetic field from the magnet(s) 97, 97*a* is not sufficient to operate (change the default/neutral state) of the unlocked reed switches 112, 112*a*.

In one embodiment comprising just the locked sensor(s) or the unlocked sensor(s) the opposing state may be inferred from the state of the relevant reed switch(es) 110, 112 of the sensor. However, the preferred embodiment comprises at least one locked sensor (reed switch) 110 and at least one unlocked sensor (reed switch) 112 since this positively identifies and indicates the position of the locking bar 18 rather than being based on an assumption. An assumed or inferred position may not fully demonstrate that the locking bar 18 is the fully locked or fully unlocked position but merely that it is not in the opposite state, i.e. locked/unlocked. There is the possibility that the locking bar 18 may be in an intermediate position, i.e. not fully/completely locked/unlocked and such a status may be misleading.

In some embodiments of the present invention, the sensor system includes a second reed switch 112*a* to detect the fork member 70 being in the unlocked position. The second unlocked reed switch 112*a* is mounted on the PCB 80 on the opposite side of the slot 82 to the first unlocked reed switch 112. This second reed switch 112*a* may cooperate with the second magnet 97*a* or a magnet mounted on the second lateral side of the fork member 70. Alternatively, the fork member 70 may only have a single magnet 97*a* mounted on this second lateral face which will thereby reliably operate this reed switch 112*a*. The use of a pair of reed switches 112, 112*a* in the unlocked position accommodates the mounting of the magnet 97, 97*a* on the fork member 70 on either face and also aids the use of the present invention with both left and right handed systems.

In the preferred embodiment, the reed switches 110, 110*a*, 112, 112*a* for the locking handle sensor have a longitudinal axis which his parallel to the longitudinal axis of the slot 82. However, the reed switch 120 for the window sash sensor has a longitudinal axis which is perpendicular to the longitudinal axis of the slot 82.

The casement window locking bar sensor includes a window sash position sensor to indicate whether the window sash 14 is open or closed. Such a sensor enables a user to confirm (remotely) that the locking bar 18 is in a locked position and the window sash 14 is in the closed position. This guarantees that the widow sash 14 is secure. In some window systems, there exists an opportunity for an alarm system to indicate that the window is secure when just the lock is in the locked configuration. However, some locks can be set to a locked position whilst the window is open or partially open (and unsecured). This would provide a false indication of the status and the window may provide an unauthorised entry to a building which would not be detected.

The casement window locking bar sensor thereby provides a further sensor comprising a first (window) sensor component mounted within the housing 54 and a second (window) sensor component is mounted on the window sash 14 itself. The sensor provides a proximity sensor which will demonstrate if the two sensor components are located adjacent to each other or are spaced apart which would indicate that the window sash 14 is in an open position within the window frame 12.

In the preferred embodiment, the housing 54 includes a sash reed switch 120 mounted on the PCB 80. The window sash 14 includes a discrete sensor component which is arranged to be independently secured to the window sash and may locate within an extrusion of the window sash 14. The extrusion houses the sensor component in the form of a magnet 122 which is positioned to change the status of the reed switch 120 when the window sash 14 is closed within the window frame 12. In particular the magnet 122 may be mounted on an element 123 located within the or about the extrusion of the window frame.

The housing also includes power means in the form of a battery 130 or batteries. These are arranged to be located within a battery compartment which is accessible to enable a user to replace the batteries easily.

The present invention provides a sensor system to reliably alert and inform a user of the status of a window. In particular, the present invention provides a sensor system which reliably informs the user if the window 10 is both in a closed position and also that the locking mechanism (locking bar mechanism) is in the locked configuration. One potential problem with prior art systems is to provide a sensor which simply shows that the window is not open although this would not show whether the locking mechanism is in the locked configuration. Alternatively, a prior art system may demonstrate that the window handle is in the locking position although this may have been inadvertently moved to such a position even though the window is in an open position. Accordingly, both situations would inform the user that the window was in a secure position when in fact it would be in a vulnerable and unsecured position.

The present invention thereby provides two independent sensor systems within the locking handle assembly 10 which are arranged to verify that the locking handle 12 is in the locked configuration and also that the window sash 14 is in the closed position relative to the window frame 12.

The locking handle assembly 10 comprises a first proximity sensor for indicating the position (or latched status) of the locking handle 52 and this comprises a first (handle) sensor component mounted to the fork member 70 and a second (handle) component fixed within the housing 54 to the PCB 80. In the preferred embodiment the fixed component is provided by a reed switch 110 located on a board (printed circuit board 80) provided within the housing 54. The first component comprises a magnet 97 which is mounted on a mounting member 90 which is secured around the coupling member (fork 70) of the locking handle 52. In particular, the present invention can be retrospectively fitted to existing window locking handle assemblies since the magnet 97 is provided on a attachable/detachable mounting member (clip) 90 for securing around the coupling member (fork 70) in an appropriate manner. The present invention also provides a suitable PCB 80 with all of the components mounted thereon. In order to accommodate these, the present invention may be provided with a housing member 54 or shroud which enables the existing handle to still function as normal whilst also housing the additional components and apparatus and providing the battery compartment. Overall, a kit for supplying the present invention may consist of the PCB 80, mounting member (clip) 90 and housing member 54. If required, a sensor component (magnet 122) may also need to be secured within or on the widow sash extrusion to enable the position of the window sash 14 to the window frame 12 to be detected.

As described above, the first sensor will alert a user as to whether the locking bar mechanism is in a locked position or an unlocked position. As mentioned above, this does not guarantee that the window is in a closed position since the window sash 14 may in fact be locked in an open position. The casement window locking bar sensor thereby provides a second sensor comprising a first (window) sensor component mounted within the housing 54 and a second (window) sensor component mounted on the window sash 14 itself. The sensor provides a proximity sensor which will demonstrate if the two sensor components are located adjacent to each other or are spaced apart which would indicate that the window sash 14 is in an open position within the window frame 12.

The casement window handle assembly 10 may comprise communication means which is arranged to communicate the status of the sensors to a user. For example, the window sensor may comprise a part of a home security system controlled by a single operating system to continuously monitor several windows, doors etc. at the same time. The communications system operates by using a WI-FI system (or Bluetooth) and a hub may be arranged to alert a user who may be located remotely in (or remotely away from) the Wi-Fi catchment area. In the preferred embodiment, the present invention is provided with a Bluetooth chip 140 to provide the required communication system. In addition, the present invention comprises a processor to monitor and control the system. In particular, the present invention may utilise an Apple coprocessor or other similar/suitable processor to handle the security of the system. The advantage of this arrangement is the security and access to an infrastructure that is the most secure available.

As mentioned above, the casement window handle 10 comprises transmission means in order to communicate the status of the window 110 through the local Wi-Fi network and/or through Bluetooth. This signal may be communicated to a cloud server and then subsequently to the smartphone of the user. The casement window handle 10 may form one part of a home automation system including a number of sensors to enable a user to monitor the status of various devices and receive targeted alerts. Each casement window handle 10 is individually coded such that a software application (app) on the smartphone will be able to correctly identify the individual window 10, for example bedroom window.

The casement window handle 10 comprises a battery 130 and this battery 130 may be inert until activated. The battery 130 is contained within a battery compartment which includes a removable cover portion 132 to allow easy access. In addition, the casement window handle 10 comprises communication means in the form of a Bluetooth module 140.

Overall, the present invention provides a window status sensor system which is solely operated by the position of the locking handle 52/locking bar 18 in combination with the position of the window sash 14 within the frame 12. This reduces the risk of obtaining a false positive in which a user may inadvertently believe that a window 10 was in the locked (and safe/secured) position when in fact the actual locking mechanism had not been correctly engaged and/or the window sash was in fact in an open position.

The invention claimed is:

1. A casement window locking assembly comprising:

a locking handle;

a housing;

a locking bar; and a coupling member to transfer movement of the locking handle to the locking bar;

wherein the locking handle is movable between a locked position and an unlocked position, the locking handle being arranged to be mounted to part of a casement window assembly comprising a window frame having a window sash movably mounted therein, the casement window locking assembly comprising a sensor system to indicate if the window sash is closed within the window frame and also if the locking handle is in the locked position, the sensor system comprising:

a first sensor and a second sensor, the first sensor comprising a first handle component secured to the coupling member and a second handle component mounted within the housing in order to detect the locking handle being in the locked position, the second sensor comprising a first window component mounted in the housing and a second window component being arranged to be mounted on the window sash in order to detect the window sash being located in a closed position, in which rotational movement of the locking handle causes translational movement of the coupling member and the first handle component is mounted on a mounting member arranged to be removably secured to the coupling member.

2. A casement window locking assembly according to claim 1 in which the mounting member comprises a clip.

3. A casement window locking assembly according to claim 2 in which the mounting member comprises a first portion and a second portion and, in which, the first portion comprises a mounting portion and the second portion comprises a retaining portion.

4. A casement window locking assembly according to claim 3 in which the mounting portion and the retaining portion inter-engage to encompass a part of the coupling member and a combination of the mounting portion and the retaining portion provide a contiguous surrounding member which extends around a periphery of the coupling member.

5. A casement window locking assembly according to claim 1 which the mounting member comprises a resilient clip and the resilient clip naturally engages around at least a part of a periphery of the coupling member and, once secured, the mounting member is constrained to move with the coupling member.

6. A casement window locking assembly according to claim 1 in which the coupling member and the mounting member comprise locating means to respectively locate and retain the coupling member and the mounting member in secured positions.

7. A casement window locking assembly according to claim 1 in which the coupling member comprises a fork member.

8. A casement window locking assembly according to claim 1 in which the locking bar comprises an elongate locking bar comprising a plurality of locking pins located thereon and wherein the locking pins are longitudinally spaced apart on the locking bar and each locking pin is arranged to be engaged in a respective keep.

9. A casement window locking assembly according to claim 1 in which each sensor comprises a proximity sensor comprising a magnet and a reed switch.

10. A casement window locking assembly according to claim 1 in which the first handle component comprises a magnet and the second handle component comprises a reed switch.

11. A casement window locking assembly according to claim 1 in which the first sensor comprises a third handle component and, in which, the second handle component is activated by the first handle component to indicate the locking handle is in the locked position and the third handle component is activated by the first handle component to indicate that the locking handle is in the unlocked position.

12. A casement window locking assembly according to claim 11 in which:

the housing contains a board having a slot defined therein, the coupling member is arranged to move translationally within the slot, the second handle component and the third handle component are mounted on the board and, the slot comprises a closed slot spaced from the periphery of the board.

13. A casement window locking assembly according to claim 12 in which the coupling member is arranged to slidably move within the slot.

14. A casement window locking assembly according to claim 13 in which the coupling member is constrained to slide within the slot and, in which, the locking handle locates on a first side of the board and the locking bar locates on a second side of the board.

15. A casement window locking assembly according to claim 1 in which the housing contains a board having a slot defined therein, and the coupling member is arranged to move translationally within the slot.

16. A casement window locking assembly according to claim 15 in which the second handle component is located towards a first end of the slot and the third handle component is located towards a second end of the slot.

17. A casement window locking assembly according to claim 16 in which the second and third handle components locate adjacent to one lateral side of the slot.

18. A casement window locking assembly according to claim 1 in which the casement window locking assembly comprises an auxiliary first sensor which comprises an auxiliary second handle component which supplement a main second handle component and wherein the auxiliary second handle component is identical to the main second handle component but mounted oppositely such that one component is for use with a left hand mounted window sash and one component is for use with a right hand mounted window sash.

19. A casement window locking assembly according to claim 18 in which the window casement locking assembly comprises an auxiliary third handle component which supplements a main third handle component and, in which, the auxiliary third handle component is identical to the main third handle component but mounted oppositely such that one component is for use with a left hand mounted window sash and one component is for use with a right hand mounted window sash.

20. A casement window locking assembly according to claim 1 in which the coupling member has at least first and second sides, and the mounting member is arranged to secure the first handle component on either of the first and second sides of the coupling member.

21. A casement window locking assembly according to claim 1 in which the second sensor comprises a proximity sensor comprising a magnet and a reed switch and, in which, the first window component comprises a reed switch and the second window component comprises a magnet.

22. A casement window locking assembly according to claim 1 in which the casement window locking assembly comprises communication means to communicate signals from each sensor to a remote unit.

23. A casement window assembly comprising a window sash, a window frame and a casement window locking assembly, wherein the casement window locking assembly is in accordance with claim 1.

24. A method of providing a window status sensor system, in which a window includes a casement window locking assembly, the casement window locking assembly comprising:

a locking handle;

a housing;

a locking bar; and a coupling member to transfer movement of the locking handle to the locking bar;

wherein the locking handle is movable between a locked position and an unlocked position, the locking handle being arranged to be mounted to part of a casement window assembly comprising a window frame having a window sash movably mounted therein, the casement window locking assembly comprising a sensor system to indicate if the window sash is closed within the window frame and also if the locking handle is in the locked position, the sensor system comprising:

a first sensor and a second sensor, the first sensor comprising a first handle component secured to the coupling member and a second handle component mounted within the housing, the second sensor comprising a first window component mounted in the housing and a second window component being arranged to be mounted on the window sash, in which rotational movement of the locking handle causes translational movement of the coupling member and the first handle component is mounted on a mounting member arranged to be removably secured to the coupling member, the method comprising using the first sensor to detect the locking handle being in the locked position and using the second sensor to detect the window sash being in the closed position.

* * * * *